United States Patent
Limerkens et al.

(10) Patent No.: US 8,168,260 B2
(45) Date of Patent: May 1, 2012

(54) CROSS-LINKABLE THERMOPLASTIC POLYURETHANES

(75) Inventors: Dominicus Limerkens, Meeuwen-Gruitrode (BE); Chris Ian Lindsay, Overijse (BE); Conny Nijs, Boutersem (BE); Steve Andre Woutters, Beveren (BE)

(73) Assignee: Huntsman International LLC, The Woodlands, TX (US)

( * ) Notice: Subject to any disclaimer, the term of this patent is extended or adjusted under 35 U.S.C. 154(b) by 481 days.

(21) Appl. No.: 12/304,500

(22) PCT Filed: Jun. 5, 2007

(86) PCT No.: PCT/EP2007/055491
§ 371 (c)(1), (2), (4) Date: Dec. 12, 2008

(87) PCT Pub. No.: WO2007/144292
PCT Pub. Date: Dec. 21, 2007

(65) Prior Publication Data
US 2009/0197000 A1    Aug. 6, 2009

(30) Foreign Application Priority Data
Jun. 14, 2006 (EP) .................................. 06115499

(51) Int. Cl.
B05D 3/02 (2006.01)
B05D 3/06 (2006.01)

(52) U.S. Cl. ............ 427/385.5; 427/243; 427/487; 427/508; 522/90; 522/96; 522/174; 528/49; 528/59; 528/75; 525/455

(58) Field of Classification Search ............ None
See application file for complete search history.

(56) References Cited

U.S. PATENT DOCUMENTS

| | | | |
|---|---|---|---|
| 4,133,723 A | 1/1979 | Howard | |
| 4,138,299 A | 2/1979 | Bolgiano | |
| 4,408,020 A * | 10/1983 | Kolycheck | 525/415 |
| 4,507,458 A | 3/1985 | Shiraki et al. | |
| 4,532,316 A * | 7/1985 | Henn | 528/59 |
| 4,560,456 A | 12/1985 | Heil et al. | |
| 4,666,781 A | 5/1987 | Lehner et al. | |
| 4,716,209 A | 12/1987 | Schmid et al. | |
| 4,762,884 A | 8/1988 | Goyert et al. | |
| 5,010,117 A * | 4/1991 | Herrington et al. | 521/159 |
| 5,087,686 A | 2/1992 | Ansell et al. | |
| 5,189,117 A * | 2/1993 | Hefner, Jr. | 525/460 |
| 5,589,543 A * | 12/1996 | Yokelson et al. | 525/131 |
| 5,864,001 A * | 1/1999 | Masse et al. | 528/75 |
| 6,142,189 A | 11/2000 | Bhattacharyya | |
| 6,258,310 B1 | 7/2001 | Sardanopoli et al. | |
| 6,323,299 B1 * | 11/2001 | Handlin et al. | 528/65 |
| 6,444,721 B2 | 9/2002 | Schwalm et al. | |
| 6,596,818 B1 | 7/2003 | Zamore | |
| 6,861,491 B2 | 3/2005 | Lagneaux et al. | |
| 2004/0024118 A1 | 2/2004 | Weihrauch et al. | |
| 2004/0236035 A1 | 11/2004 | Lagneaux et al. | |
| 2005/0009640 A1 * | 1/2005 | Isogawa et al. | 473/371 |

FOREIGN PATENT DOCUMENTS
WO    WO 02/44239    6/2002

* cited by examiner

Primary Examiner — Erma Cameron
(74) Attorney, Agent, or Firm — Robert A. Diaz (57) ABSTRACT

The invention provides a cross-linkable elestomeric thermoplastic polyurethane that is urea free, isocyanutrate free, oxazolinyl free, functional radically-polymerizable pendant group free and having terminal functional radically-polymerizable groups at both ends, and thermoset polyurethanes obtained therefrom.

The invention also provides applications of the compositions, and processes for manufacturing these compositions.

19 Claims, 2 Drawing Sheets

CROSS-LINKABLE THERMOPLASTIC POLYURETHANES

CROSS REFERENCE TO RELATED APPLICATIONS

This application is the National Phase of International Application PCT/EP2007/055491 filed Jun. 5, 2007 which designated the U.S. and which claims priority to European (EP) Pat. App. No. 06115499.3 filed Jun. 14, 2006. The noted applications are incorporated herein by reference.

FIELD OF THE INVENTION

This invention relates generally to the conversion of thermoplastic polyurethanes into thermoset polyurethanes and more specifically to such thermoset polyurethanes exhibiting improved physical and chemical properties, relative to the corresponding thermoplastic polyurethanes.

BACKGROUND OF THE INVENTION

Thermoplastic polyurethanes (TPU's) are well-known thermoplastic polymers, often elastomers, in particular for their very high tensile and tear strength, high flexibility at low temperatures, extremely good abrasion and scratch resistance. Thermoplastic polyurethanes are also known for their superior dynamic properties in particular very high rebound figures, low compression set and hysteresis loss. TPU's find application based upon their amenability to solution or melt processing into a versatile array of forms (for example films, tubes, complex molded shapes, coatings) via a broad range of techniques (for example extrusion, injection-molding, calendaring, solution coating).

A major technical challenge underlying thermoplastic polyurethanes is that although thermoplastic polyurethanes are relatively easy to process, the high temperature stability, durability, resistance to creep, (high temperature) dynamic behavior of these polyurethanes, as well as their stability in some commonly-used organic solvents, is less than might be desired for some applications.

Furthermore, following the trend compared with the reactive injection molded polyurethane, known as 2 liquid component polyurethane, there is a demand for lighter and better materials (preferably elastomeric), and even lower density polyurethane (PU) material which, in turn, represents an even bigger technical challenge to provide, if possible, equal or better physical and chemical properties compared to conventional low density TPU and PU (minimum of approximately 700 kg/m$^3$) and certainly equal or better properties to ethylene-vinyl acetate (EVA) foams obtained by EVA foaming technology at density ranges between 0.1 and 0.4 g/cc.

In view of the above, there is a continuing need for a polyurethane formulator to find a polyurethane-forming composition/process that meets the above challenges.

Such compositions desirably would provide advantageous process capability, known in the market as thermoplastic process techniques such as extrusion, injection molding and thermo-cast, when the composition is in the thermoplastic state and advantageous elevated temperature stability and solvent resistance when the composition is thermoset during formation into the desired product in the mould. The concept of the present invention is to provide a TPU which is thermoplastically processable but which can subsequently be converted to a thermoset material by a cross-linking reaction.

There is also a need for post-crosslinkable films, mouldings, extruded profiles, and the like.

The present invention hence provides such desirable compositions, together with processes for the production of the compositions.

EP 305175 discloses a radiation curable composition for an adhesive including a polyurethane comprising residue of a polyether diol or a polyester diol and capped with residues of a hydroxyalkyl acrylate or methacrylate and non-polymerizable residues of a primary or secondary alcohol. This composition is liquid at room temperature, whereas the composition of the invention is an elastomeric solid at room temperature.

U.S. Pat. No. 6,444,721 describes a water dispersible radiation curable polyurethane composed essentially of aliphatic polyisocyanates, cycloaliphatic diols and/or diamines, compounds and at least one free-radically polymerizable unsaturated group.

U.S. Pat. No. 4,666,781 describes a linear thermoplastic polyurethane possessing acrylate side and terminal groups wherein the polyurethane is prepared by reacting poly- and/or diisocyanates with a mixture of (a) methacrylate- or acrylate-diols, (b) monoesters of methacrylic or acrylic acid and a diol and other organic polydiol compounds. This polyurethane composition is used as a binder in the magnetic layer of a magnetic material in magnetic tape and was conceived so as to allow the distribution of the magnetic pigment in the binder (a relatively flexible binder is needed).

U.S. Pat. No. 4,762,884 describes a process for the production of polyurethanes using cross-linking agents.

U.S. Pat. No. 4,560,456 describes magnetic recording media which partially comprise polyurethane acrylates having number average molecular weights between 1,800 and 10,000 in addition to acrylate prepolymers, monomeric acrylates and N-vinyl monomers. These compositions deliver radiation-curable coatings suitable for use in magnetic recording media but do not deliver materials suitable for melt processing into articles such as those provided in the current invention.

U.S. Pat. No. 4,507,458 describes radiation curable urethaneacrylate resins suitable for solution processing and use as thermally or radiation-curable adhesives or coatings. However, this process does not deliver materials suitable for melt processing into high quality articles such as those provided in the current invention.

U.S. Pat. No. 4,133,723 describes energy-curable coating compositions based upon unsaturated urethane resins but these lack a chain extender and consequently do not have a mesophase structure. None of the documents cited above teaches or suggests the present invention.

SUMMARY OF THE INVENTION

It has now been surprisingly found that the compositions and processes of the present invention meet the above challenges. The present invention is concerned with crosslinkable thermoplastic polyurethanes and processes for preparing these products. The invention also provides for TPU compositions in the form of pellets or a film, the latter being suitable for use in the manufacture of, for example, car protective coatings, waterproof clothing, temperature-resistant moulded seals, cable jacketing and adhesives between fabric layers.

The invention thus provides a cross-linkable elastomeric thermoplastic polyurethane that is urea free, isocyanurate free, oxazolinyl free, functional radically-polymerizable pendant group free and having terminal functional radically-polymerizable groups at both ends.

The invention also provides a elastomeric thermoplastic polyurethane, obtainable by reacting a polyfunctional isocyanate, a polyfunctional polyol and a monol or monoamine comprising radically-polymerizable unsaturation(s), and a diol chain extender, which is preferably urea free, isocyanurate free, oxazolinyl free, functional radically-polymerizable pendant group free.

The invention also provides a composition of a thermoplastic polyurethane of the invention together with a reactive co-cross-linker.

The invention also provides a process for the preparation of the thermoplastic polyurethane of the invention which is one-shot or prepolymer route.

The invention also provides a thermoset elastomeric polyurethane comprising a mesophase separated polyurethane structure and having a molecular weight between cross-links from 12000 to 500000, preferably from 20000 to 200000. The mesophase separated polyurethane structure can be derived from the thermoplastic polyurethane of the invention.

The invention provides also a process for preparing a set polyurethane, comprising the step of cross-linking a thermoplastic polyurethane composition of the invention.

The cross-linking can be at least partially during extrusion or injection-moulding of said thermoplastic polyurethane composition. The process can comprise the steps of preparation of a film of the thermoplastic polyurethane, preferably by casting or extrusion, and application of said film to a substrate and subsequent cross-linking onto said substrate, where the cross-linking can be partially carried out before application onto the substrate.

The invention also provides a reaction system comprising:
a) a polyfunctional isocyanate;
b) a polyfunctional polyol;
c) a diol chain extender; and
d) a monol or monoamine comprising radically polymerizable unsaturation;
or a prepolymer thereof.

The invention also provides a modified prepolymer comprising:
a) a polyfunctional isocyanate;
b) a polyfunctional polyol; and
c) a monol or monoamine comprising radically polymerizable unsaturation.

A radically polymerisable co-crosslinker may be present.

The invention also provides the use of the polyurethanes, compositions, reaction systems, modified prepolymers for preparing protective films, car coatings, extruded profiles and moulded articles.

DETAILED DESCRIPTION OF EMBODIMENTS OF THE INVENTION

Other objects, features and advantages will become more apparent after referring to the following specification.

Thermoplastic Polyurethane (TPU)

The thermoplastic polyurethane (TPU) of the invention is elastomeric, urea free, isocyanurate free, oxazolinyl free, polymerizable pendant group free with terminal functional groups on both ends of the polymer generated from the reaction of a difunctional isocyanate, a difunctional polyol and a monol comprising unsaturation, and a difunctional diol chain extender. The elastomeric thermoplastic polyurethane (so-called "TPU") or the reactants forming a urethane linkage are suitably converted to a thermoset polyurethane by employing a reactant forming a urethane linkage, or the reaction product thereof (TPU), and a crosslinking agent and subsequently crosslinking said composition. The cross-linking reaction can take place at any time during the process, e.g. in the extrusion barrel, or after the process. The technique of the invention offers substantial advantages in terms of the product itself and in terms of processing. At the same time, the resulting thermoset polyurethane exhibits advantageous physical and chemical properties.

As used herein, the term "thermoplastic" is used in its broad sense to designate a material that is reprocessable at an elevated temperature, whereas "thermoset" designates a material that exhibits high temperature stability without such reprocessability at elevated temperatures. The term "elastomeric thermoplastic" designates a material that possesses an elastomeric property such that it exhibits at least 100% elongation without breaking when stretched at room temperature, and will at least partially relax when released.

As used herein the term "urea group free" is used to design a polymer backbone with less than 0.1% free urea groups available for reaction with other molecules. Similarly, the terms isocyanurate free and oxazolinyl free are used to design a polymer backbone with less than 0.1% free isocyanurate or oxazolinyl groups available for reaction with other molecules.

As used herein the term "pendant group free" is used to design a polymer backbone having less than 0.01% of pendant groups containing polymerizable double bonds.

The reactants for forming a urethane linkage are selected from a difunctional isocyanate composition and at least one difunctional polyhydroxy compound, a functional monol serving as chain stopper and a chain extender (typically a low molecular weight diol) in such amounts that the isocyanate index is generally between 80 and 110, preferably between 98 and 102.

The polyurethane thus synthesized incorporates unsaturated moieties at both polymer ends, has no pendant groups and is urea group free.

It should be clear that the term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

The term "difunctional" as used herein means that the overall functionality of the isocyanate composition and the polyhydroxy compound is about 2.

The term "isocyanate index" as used herein is the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymer forming process involving the isocyanate ingredient and the isocyanate-reactive ingredients. Any isocyanate groups consumed in a preliminary step to produce modified polyisocyanates (including such isocyanate-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free isocyanate-reactive hydrogens present at the actual elastomer forming stage are taken into account.

The modified TPU's are prepared from the starting materials for a thermoplastic polyurethane, i.e. polyols, diisocyanates and chain-extending agents, in the presence of chain stoppers containing unsaturation to an uncrosslinked homogeneous polyurethane elastomer mixture.

The difunctional isocyanate composition may comprise any aliphatic, cycloaliphatic or aromatic isocyanates. Aromatic polyisocyanates are preferred, especially those derived from diphenylmethane diisocyanate (MDI).

The polyisocyanate composition used in the process of the present invention may consist essentially of pure 4,4'-diphenylmethane diisocyanate or mixtures of that diisocyanate with one or more other organic polyisocyanates, especially other diphenylmethane diisocyanates, for example the 2,4'-isomer optionally in conjunction with the 2,2'-isomer. The polyisocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

Preferred polyisocyanate compositions are those containing at least 90% by weight of 4,4'-diphenylmethane diisocyanate or its hydrogenated derivative. More preferably, the 4,4'-diphenylmethane diisocyanate content is at least 95, and most preferably at least 98% by weight.

The difunctional polyol used has a molecular weight of between 500 and 20000 and may be selected from polyesteramides, polythioethers, polycarbonates, polyacetals, polyolefins, polysiloxanes and, especially, polyesters and polyethers.

Mixtures of two or more compounds of such functionalities and in such ratios that the total composition is difunctional may also be used as the difunctional polyhydroxy compound. Polyether diols which may be used include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

Polyester diols which may be used include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polycaprolactones and unsaturated polyesterpolyols should also be considered.

Polyesteramides may be obtained by the inclusion of aminoalcohols such as ethanolamine in polyesterification mixtures.

Polythioether diols which may be used include products obtained by condensing thiodiglycol either alone or with other glycols, alkylene oxides, dicarboxylic acids, formaldehyde, amino-alcohols or aminocarboxylic acids.

Polycarbonate diols which may be used include those prepared by reacting glycols such as diethylene glycol, triethylene glycol or hexanediol with formaldehyde. Suitable polyacetals may also be prepared by polymerizing cyclic acetals.

Suitable polyolefin diols include hydroxy-terminated butadiene homo- and copolymers and suitable polysiloxane diols include polydimethylsiloxane diols.

Polyester diols, polyether diols and polycarbonate diols are preferred in the present invention. Suitable difunctional chain extenders include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methylpentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butylenediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Diesters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378, are also suitable.

Low molecular weight TPU's are obtainable by using chain stoppers as monofunctional alcohol or amine compounds (hereinafter referred to under the term "monol" for sake of convenience) containing an unsaturation such as hydroxyethylacrylate, pentaerythritoltriacrylate, caprolactonemonoacrylate, hydroxyethylmethacrylate, dipentaerythritolpentaacrylate, 2-hydroxypropylacrylate, 2-hydroxypropyl methacrylate, 4-hydroxybutylacrylate, 4-hydroxybutylmethacrylate, 3-chloro-2-hydroxypropylacrylate, 6-hydroxyhexylacrylate and 6-hydroxyhexylmethacrylate, allylalcohol, 2-methyl-3-butene-2-ol and all hydroxy vinylethers such as e.g. cyclohexanedimethanolmonovinylether, diethyleneglycolmonovinylether and others.

The amount of monol may be such that the molecular weight (MW) (measured as number average Mn) of the final TPU can be comprised between 12000 and 500000, preferably between 20000 and 200000. The amount of monol is typically from 0.001 moles/100 g to 0.016 moles/100 g, preferably from 0.002 moles/100 g to 0.01 moles/100 g of the polymer composition. The monol acts usually as a chain stopper so that the MW can be controlled. Using TPU's with MW as low as 12000 allows the melt viscosity to be reduced and controlled. By controlling the MW, the process can also be controlled and adjusted. However, if the MW is allowed to fall below 12,000 the performance of the TPU may diminish to the extent that a mechanically robust, melt processable TPU cannot be obtained. Therefore, the MW must be maintained above the level at which 100% elongation at break is achieved.

The invention also allows controlling the hard block content of the TPU that is used in the invention; especially one can control the processing and final use temperature of the final products in addition to the thermomechanical performance.

The hardness of the materials of the invention can be varied by changing the amount of hard block level in the thermoplastic polyurethane. Typically, the hard block level is varied between 7 and 60% with hard block level being defined as the weight percentage of chain extender and isocyanate in the TPU; preferred values are from 10 to 50%, such as 10 to 40%.

Other conventional ingredients (additives and/or auxiliaries) may be used in making the polyurethanes. These include catalysts, surfactants, flame proofing agents, fillers, pigments, stabilizers and the like Catalysts which enhance the formation of urethane and urea bonds may be used, for example, tin compounds, such as a tin salt of a carboxylic acid, e.g. dibutyltin dilaurate, stannous acetate and stannous octoate; amines, e.g. dimethylcyclohexylamine and triethylene diamine. The polyurethane chains are obtained by classical methods known in the art (see for example Polyurethanes Handbook $2^{nd}$ edition, G. Oertel, 1994). The chains are notably obtained by the reaction of a diisocyanate, an isocyanate-reactive compound (a polyol), a chain stopper and the chain extender of the invention, in conditions such that no pendant groups and no urea group are obtained. One may revert for information on how to conduct synthesis processes in The Polyurethanes Book, D Randall & S Lee (Eds); Wiley, and especially chapter 7, pp 113-123, chapter 21 pp 314-330.

The reaction product from the reactants forming the urethane linkage (the so-called "TPU") suitable according to the invention can be produced in the so-called one-shot, semi-prepolymer or prepolymer method known in the art, by casting, extrusion, reaction injection molding or any other batch or continuous process known to the person skilled in the art. The TPU's thus produced are generally supplied as granules or pellets, and can be processed according to know techniques.

All reactants can be reacted at once, or can be reacted in a sequential manner. By prior mixing of all or part of the unsaturated chain stopper of the invention with all or part of the isocyanate-reactive compounds solutions or suspensions or dispersions are obtained, depending on the unsaturated chain stopper and isocyanate-reactive compounds used. The various components used in the manufacture of the compositions of the invention can in fact be added in any order.

For example, one may use a prepolymer of isocyanate and polyol, then add the diol and the monol, or one may use a prepolymer of isocyanate and polyol and the monol, then add the diol.

The process can be selected from the group consisting of (i) a bulk process, either batch or continuous process including cast process, and (ii) a continuous reactive extrusion process.

Cross-Linking

Cross-linking can be initiated either via the thermal route or via the actinic route, including UV and electron beam (EB) radiation.

Compounds suitable as thermal crosslinking initiators are organic peroxides such as dicumylperoxide, 2,5-dimethyl-2,5-di(tert.-butyl)peroxide, 2,5-Bis(tert.-butylperoxide)-2,5-dimethyl-3-hexyne, di-tert.-butylperoxide, 2,5-Bis(tert.-butylperoxide)-2,5-dimethyl-hexane, Bis(tert.-butylperoxyisopropyl)benzene, m-octadexylazoformate and tert.-butyl peroxycumene. A preferred cross-linker is 2,5-Bis(tert.-butylperoxide)-2,5-dimethyl-hexane. Another method for cross-linking is exposure to actinic radiation such as ultraviolet light or electron beam for an appropriate period of time.

Typical UV initiators comprise ketones such as 1-hydroxy-cyclohexylphenylketone, 2,2-dimethoxy-1,2-diphenylethan-1-one, 1-[4-(2-hydroxyethoxy)-phenyl]-2-methyl-1-propanone (HHPMP), and (bis)acylphosphineoxides such as bis (2,4,6-trimethylbenzoyl)-phenyl-phosphoneoxide (BTPPO)

It is also possible to use co-cross-linkers in addition to the cross-linking units at the extremities of the TPU of the invention.

Co-cross-linkers which may be used with advantage in the instant invention are monomers which lie dormant during initial processing but which polymerize if subjected to appropriate polymerization conditions. Notably unsaturation containing monomers can be used in the present invention, where the co-cross-linker contains at least one polymerizable unsaturated group, preferably radically polymerizable group.

The co-cross-linker may include any of the chain stoppers mentioned above, plus any radically polymerizable monomer or oligomer. Examples of such co-cross-linkers are dipentaerythritolpentaacrylate, trimethylolpropanetrimethacrylate, ditrimethylolpropanetriacrylate, pentaerythritoltetraacrylate, trimethylolpropanetriacrylate, butanedioldimethacrylate, ethoxylated pentaerythritoltetraacrylate, hexanedioldimethacrylate, hexanedioldiacrylate, laurylmethacrylate, 2-phenoxyethylmethacrylate, 2-phenoxyethylacrylate, polyethyleneglycoldiacrylate, polypropyleneglycoldiacrylate, poycaprolactonediacrylate.

The co-cross-linker may be the same as the chain stopper; having one chemical only for use at two different points in the process will bring economy to the overall process in terms of sourcing, transportation, etc.

The co-cross-linker can be used to introduce another functionality into the polymer, for example a hydrophilic (EO) or hydrophobic (PO or silicone) acrylate.

Process of the Invention.

The process according to the invention may comprise as a first step feeding a composition comprising reactants forming a urethane linkage or the reaction product thereof optionally together with a co-crosslinking agent at a temperature at which no crosslinking occurs or only partially occurs. At the end of the process, the material is melt processable like a thermoplastic material.

Another embodiment of the invention concerns conversion of a thermoplastic polyurethane to a thermoset polyurethane by processing, preferably by injection molding, extrusion, casting cross-linkable thermoplastic polyurethanes according to the invention at the crosslinking temperature of the crosslinking agent. In this embodiment melt processing and cross-linking are achieved in a single step.

The thermoplastic polyurethanes of the present invention can be processed via a variety of molding techniques. Films and profiles can be made by using standard techniques such as extrusion and articles such as seals or sports-shoe sole parts can be produced via injection-moulding. Low melt temperatures can be used to process the TPU of the invention.

In one embodiment of the invention a masterbatch of the chemical initiator in a thermoplastic (preferably TPU) is prepared and blended with the unsaturation-containing TPU prior to or during melt processing. The masterbatch method comprises the steps of (a) feeding a cross-linkable thermoplastic polyurethane composition; (b) feeding a thermoplastic composition comprising a cross-linking initiator; (c) processing said compositions to form a cross-linkable melt-processable polymer; (d) cross-linking said cross-linkable melt-processable polymer; wherein step (d) may occur after step (c) or partially during step (c).

The amount of co-cross-linker, if one is used, is usually between 0.1 and 99 parts by weight per 100 parts by weight of the thermoplastic polyurethane. Preferably, between 1 and 50 parts by weight per 100 parts by weight of the thermoplastic polyurethane of cross-linker is added. An amount of between 5 and 30 parts by weight per 100 parts by weight of the thermoplastic polyurethane of co-cross-linker is most preferred.

The co-cross-linkers can be either added with the reactants or compounded with the thermoplastic polyurethane, optionally in the presence of other process regulative substances and additives, at a temperature below the decomposition temperature of the crosslinking agent present. It is also possible to blend the chemical initiator with the unsaturation containing TPU prior to or during melt processing. The compounded thermoplastic polyurethane is generally processed to a granular, pellet, film, profile or moulded form.

The mixing of the reactants with the co-crosslinking agent may be carried out using any suitable mixing device followed by a batch or continuous polymerization process carried out at a temperature at which no or only partial cross-linking occurs. Mixing of the unsaturation-containing thermoplastic polyurethane with the crosslinking agent is carried out by methods such as absorption or solids blending followed by a temperature controlled thermoplastic process, e.g. known as single, twin screw and Buss co-kneader, capable to control temperature and shear viscosity to prevent premature activation of the crosslink agent. In general, the temperature is kept below the activation temperature for crosslinking.

In another aspect, the invention concerns the conversion of a thermoplastic polyurethane to a low density thermoset polyurethane by processing the cross-linkable thermoplastic polyurethanes according to the invention at a temperature above the decomposition temperature of a blowing agent and at the crosslinking temperature of the crosslinking agent.

In yet another composition aspect, the invention is concerned with a reaction system for use in the preparation of expandable crosslinkable thermoplastic polyurethanes comprising:
  a) reactants forming a urethane linkage or the reaction product thereof
  b) cross-linker
  c) blowing agent and, optionally,
  d) additives conventional in thermoplastic processing According to another aspect of the present invention, it is possible to produce expanded elastomeric materials having densities ranging from as low as 100 kg/m$^3$ to as high as 1200 kg/m$^3$ having unique physical properties ranging in skin hardness from very low Shore A to high hardness up to 90 Shore A, which renders them suitable for a wide variety of elastomeric applications in the shoe and automotive industry.

Any known chemical or physical blowing agent may be used in the preparation of expanded thermoplastics in the present invention so as to obtain expanded thermoplastic polyurethanes. Examples of suitable chemical blowing agents include gaseous compounds such as nitrogen or carbon dioxide, gas forming compounds such as (modified) azodicarbonamides, carbonates, bicarbonates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides such as 4,4'-oxybis(benzenesulfohydrazide) and diphenylsulfone-3,3'-disulfo hydrazide, malonic acid, citric acid, sodium monocitrate, ureas, azodicarbonic methyl ester, diazabicyclooctane and acid/carbonate mixtures.

Examples of suitable physical blowing agents include isopentane, isobutane, n-butane, n-pentane, nitrogen, carbon dioxide, dimethylether, 1-chloro-1,1-fluoromethane, and all other CFC compounds.

Thermally expandable microspheres containing an aliphatic hydrocarbon are also suitable blowing agents for the present invention. Such microspheres are commercially available, and one source being Nobel Industries of Sweden which markets such microspheres under the trademark EXPANCEL. EXPANCEL-DU microspheres are dry, unexpanded microspheres consisting of small spherical particles with an average diameter of 10 to 15 micron based on volume. The sphere is formed of a gas proof polymeric shell (polyvinylidene chloride: PVD), encapsulating a minute drop of liquid isobutane. When these microspheres are subjected to heat at an elevated temperature level (i.e., 150° C. to 200° C.) sufficient to soften the thermoplastic shell and to volatilize the liquid isobutane encapsulated therein, the resultant gas expands the shell and increases the volume of the microspheres. When expanded, the microspheres have a diameter 3.5 to 4 times their original diameter as a consequence of which their expanded volume is about 50 to 60 times greater than their initial volume in the unexpanded state. Microspheres are also available whose shell is of acrylonitrile.

The amount of blowing agent is usually between 1 and 20 parts by weight per 100 parts by weight of the thermoplastic polyurethane. Preferably, between 1 and 5 parts by weight per 100 parts by weight of the modified thermoplastic polyurethane of blowing agent is added. An activator for the blowing agent is typically present as well. Suitable activators are zinc oxide, zinc stearate and zinc.

The activator is usually added in an amount of between 0.5 and 5 parts by weight per 100 parts by weight of the thermoplastic polyurethane. Preferably, between 1 and 3 parts by weight per 100 parts by weight of the thermoplastic polyurethane of activator is added. Blowing preferably takes place before cross-linking.

Another aspect of the invention is the use of stabilizers to inhibit the thermal reaction of the unsaturated polymerizable groups during melt processing. The occurrence of such reactions can lead to undesirable consequences such as the formation of gels in the processed thermoplastic or the generation of an intractable thermoset before the material has been processed into the desired form. It has been found that the use of a number of classes of stabilizer which inhibit radical formation or act as radical scavengers can prove effective in inhibiting the onset of thermal cross-linking of the TPU's via retarding the thermal reaction of the unsaturated polymerizable groups. Once such class of stabilizers is hindered phenols (which are traditionally used as antioxidants) and/or thermal stabilizers. Examples of such compounds are families of phenolic compounds such as 2,6-dialkyl phenols (e.g. 2,6-di-tert-butyl-4-methylphenol), alkylated hydroquinones (e.g. 2,5-di-tert-butyl-hydroquinone), alkylidene bisphenols (e.g. 2,2'-methylene-bis-(6-tert.-butyl-4-methylphenol)). These are commercially available under the "Irganox" trade name, (e.g. Irganox 1010, Irganox 1076, Irganox 1135, Irganox 245). Another family of compounds useful in the current invention is Hindered Amine Light Stabilizers (HALS). These compounds are often used as light stabilizers but their radical scavenging mechanism also enhances thermal stability. Examples include bis(2,2,6,6-tetramethyl-4-piperidinyl) sebacate, other derivatives of 2,2,6,6-tetramethylpiperidine and derivatives of 1,2,2,6,6-pentamethylpiperidine.

Examples of commercially available HALS include Tinuvin 770, Tinuvin 765, Tinuvin 622, Tinuvin 123 and Chimassorb 944.

In addition to the aforementioned classes of stabilizers, any family of compounds which is capable of inhibiting radical formation or scavenging radicals may thermally stabilize the unsaturated polymerizable groups. Such families of compounds also include phosphates, phosphonates, triazines, aromatic esters, aromatic amides and O-, N- and S-benzyl compounds.

The amount of stabilizer in compositions of the invention typically amount to 0.5 to 2 wt %, most advantageously 1 to 2 wt %, i.e. an amount which is in some aspects greater than amounts used in prior art.

Applications.

Blends (both physical and chemical blends) of the thermoplastic polyurethanes according to the present invention with other thermoplastics may also be used. Such other thermoplastics are e.g. polyolefins, polystyrene, ethylene-vinyl acetate copolymers, polyvinyl chloride, rubbers such as isoprene rubber and others. Compatibilizing agents may sometimes be required in order to achieve a proper blending of the compounds.

The other thermoplastic may be added in amounts of up to 95 parts by weight of the thermoplastic polyurethane of the present invention. Preferably, not more than 70 parts by weight, based on the thermoplastic polyurethane of the invention, of other thermoplastics is added.

Blends of the thermoplastic polyurethanes according to the present invention with other products may also be used. Such other product might be glass fiber.

Blends of the invention include blends of the TPU before cross-linking as well as blends after cross-linking, i.e. blends with the set polymer. In case of blends, cross-linking can be carried out on the blends with TPU's.

The co-cross-linker may also act as a plasticizer and/or melt-viscosity reducer for the TPU itself.

The TPU compositions of the invention are useful in many aspects.

The cross-linked polyurethane compositions of the invention would be highly suitable for use in the protective films industry. Especially aliphatic TPU's are used for paint protection to improve resistance scratching. The additional linking would improve the resistant properties of these paints and resins. In the film application, a stabilizer will be useful to avoid formation of gel, which improves the final aspect of the film.

The polymers of the present invention may be used in the manufacture of impact resistant glass. Cross-linking of a glass/TPU/polycarbonate polymer will prevent creeping from a load and increase durability of the glass. In both of these cases the TPU may be applied as a liquid coating and cross-linked using UV afterwards.

The thermoset polyurethanes obtainable via the process of the present invention are also suitable for use in any application of thermoset elastomers including, for example, footwear, Cable & Wire or automotive applications. In addition, the expanded thermoplastics can be used in applications such as footwear, furniture, automotive, cables and hoses. Further end-uses include water-proof clothing, adhesives between fabric layers, etc.

In case of protective films (e.g. car coatings), the invention will make use preferably of aliphatic TPU (e.g. using (cyclo) aliphatic isocyanate (hydrogenated MDI), aliphatic chain extender diol, plus aliphatic polyol). The protective films will provide resistance to yellowing (under action of light), resistance to abrasion, chemicals, etc. The films will provide protective coating to enhance durability and resistance to staining. The standard film usually requires an acrylic top coat; the invention allows avoiding such acrylic top coat.

Cross-Linked TPU's.

Upon cross-linking there will be a chemical bond between the TPU and the (acrylic) polymer (at the interface with the interpenetrating polymer formed from the (mono)functionalized monomer). The TPU is also integrated into a polymer in an excellent manner. The TPU chains contain hard blocks and soft blocks, and these blocks will align upon cross-linking. Since cross-linking is achieved only at the extremities, because there is no pendant group or other functional groups along the chain, the TPU chains will align in a manner of a ladder, forming the rungs of the ladder while the polymer formed upon cross-linking of the extremities (optionally with a co-cross-linker) will form the stiles of the ladder. By aligning along the "stiles", the hard blocks and the soft blocks will then form a mesophase. Hence the invention provides a thermoset polyurethane prepared from the compositions of the invention which incorporates a mesophase separated polyurethane structure (having the MW of the starting TPU) and in which the molecular weight between cross-links (Mc) is controlled by the molecular weights of the precursor thermoplastic polyurethane and, optionally, co-cross-linker. The molecular weight Mc can be comprised between 12000 and 500000, preferably between 20000 and 200000.

Hence, the invention also provides such a mesophase separated polyurethane structure.

The invention is illustrated, but not limited, by the following examples in which all parts, percentages and ratios are by weight. The melting and crosslinking behavior of the materials may be assessed by methods such as Rotational Dynamic Shear Rheometry.

Example 1

Experimental Preparation & Evaluation of a Thermally Cross-Linkable TPU

Materials.
2,5-dimethyl 2,5-di-tert-butylperoxyhexane
polyhexyleneadipate (OHv=37 mg/g KOH)
methylenediphenylenediisocyanate (MDI; 98% 4,4'isomer and 2% 2,4 isomer)

Synthesis.

MDI (15.95 g), 1,4-butanediol (3.0 g), 2-hydroxyethylmethacrylate (1.05 g), polyhexyleneadipate (80.0 g; stabilized with 0.05% Tinuvin 770DF and 0.15% Irganox 1010), 1 drop of catalyst solution (16.7% Coscat 83 in N-methylpyrolidinone) and various concentrations of 2,5-dimethyl 2,5-di-tert-butylperoxyhexane (0-1.0%) were mixed under vacuum for 1 minute at a speed of 1500 rpm. The mixture was then poured into disc shaped moulds on a hot plate and cured in an oven at 80° C. overnight to yield cross-linkable TPU's with a calculated Mn of 25000.

Curing.

Figure 1:
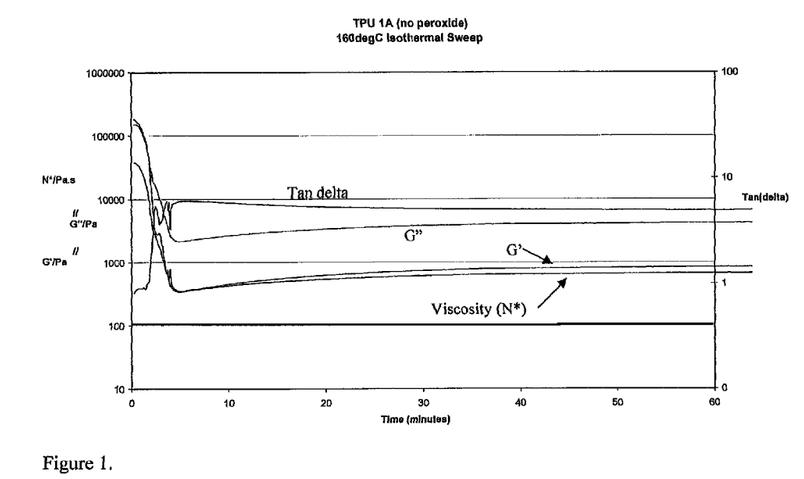
FIGS. 1 and 2 show the rheological curves at 160° C. for cross-linkable TPU's (Mn=25000) incorporating 0% (TPU 1A) and 0.4% (TPU 1B) 2,5-dimethyl 2,5-di-tert-butylperoxyhexane respectively, as used in example 1.
Figure 2:
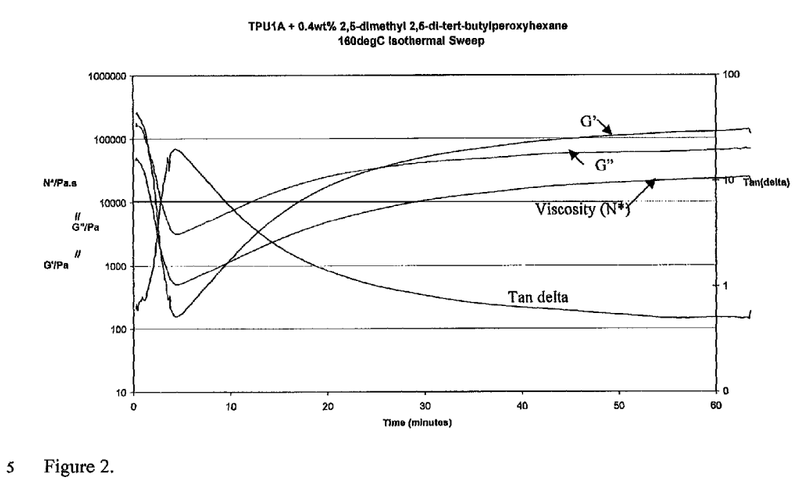

The melting and crosslinking behavior of the materials was assessed by isothermal Rotational Dynamic Shear (RDS) rheometry on sample discs (25 mm×1 mm) subjected to an oscillation frequency of 1.0 Hz and an applied torque of 10.0 μN m. FIGS. 1 and 2 show the Theological curves at 160° C. for cross-linkable TPU's (Mn=25000) incorporating 0% (TPU 1A) and 0.4% (TPU 1B) 2,5-dimethyl 2,5-di-tert-butylperoxyhexane respectively. FIG. 1 shows typical behavior for a melting thermoplastic (viscosity decreases and G">G' at higher temperatures) whereas FIG. 2 represents a thermosetting process (viscosity increases and G"<G' at higher temperatures).

Example 2

Preparation of a Thermally Cross-Linkable TPU Via a Masterbatch Route

Formulation

Irostic M7090[a]+50/50 2,5-dimethyl-2,5-di-tert-butylperoxyhexane/silica powder masterbatch [a]Irostic M7090 is a low melting TPU adhesive available from Huntsman Polyurethanes Procedure.

Irostic M7090 (49.5 g) was added to the chamber of brabender plasticorder at the desired temperature using a screw speed of 110 rpm. After 4 minutes the temperature was stable and the Irostic M7090 was fully molten. The 50/50 2,5-dimethyl-2,5-di-tert-butylperoxyhexane/silica masterbatch (5.5 g) was then added and the torque was monitored against time. A stable torque indicated thermoplastic melt behavior whereas an increase in torque indicated the onset of cross-linking.

Results.

Figure 3:
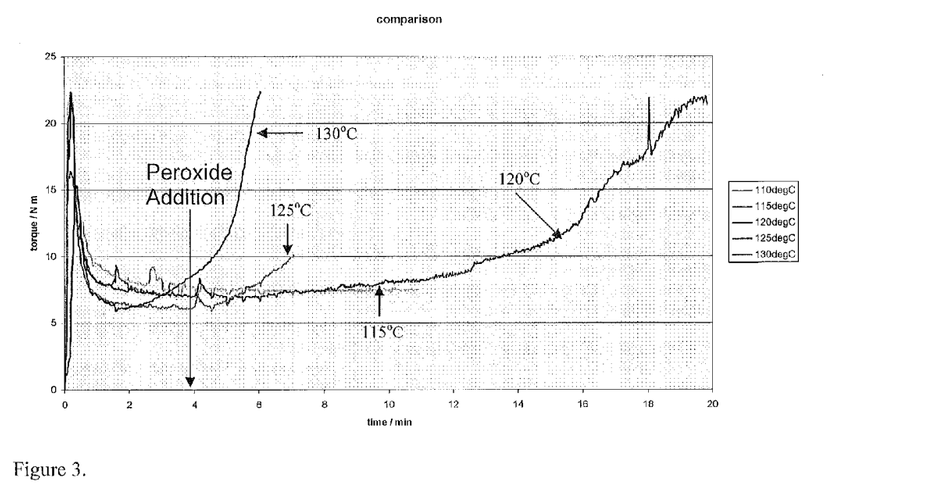
FIG. 3 is a representation of Torque vs Time Plot for Preparation of an IROSTIC M7090/10 wt % (50/50 2,5-dimethyl 2,5-di-tert-butylperoxyhexane/silica masterbatch), as used in example 2.

Torque versus time plots of the Irostic M7090/10 wt % (50/50 2,5-dimethyl-2,5-di-tert-butylperoxyhexane/silica) blends are shown in FIG. 3. The point of addition of the 2,5-dimethyl-2,5-di-tert-butylperoxyhexane/silica masterbatch (4 minutes) is indicated. The graphs show that 110° C., 115° C. and 120° C. are suitable conditions for preparation of a thermoplastic masterbatch (there is no evidence of cross-linking until at least 8 minutes after peroxide addition, i.e. much longer than the time needed for efficient mixing). At 125° C. and above cross-linking begins at a very early stage (this temperature would then be a practical limit for masterbatch preparation).

(ii) Preparation and Thermal Cure of Cross-Linkable TPU Materials

TPU 2A: TPU based on MDI/1,4-butanediol/polyhexyleneadipate (OHv=37 mg/g KOH) incorporating 1 wt % 2-hydroxyethylmethacrylate Peroxide Masterbatch: Irostic M7090/10 wt % (2,5-dimethyl-2,5-di-tert-butylperoxyhexane/silica masterbatch)

Procedure

A blend of 90 wt % TPU 2A and 110 wt % of the peroxide masterbatch was added to the chamber of a brabender plasticorder at the desired temperature using a screw speed of 110 rpm. The measured torque generated by the melt was measured against time for each chosen melt temperature in order to detect the onset and rate of cross-linking (observed as an increase in torque).

Results

Figure 4:
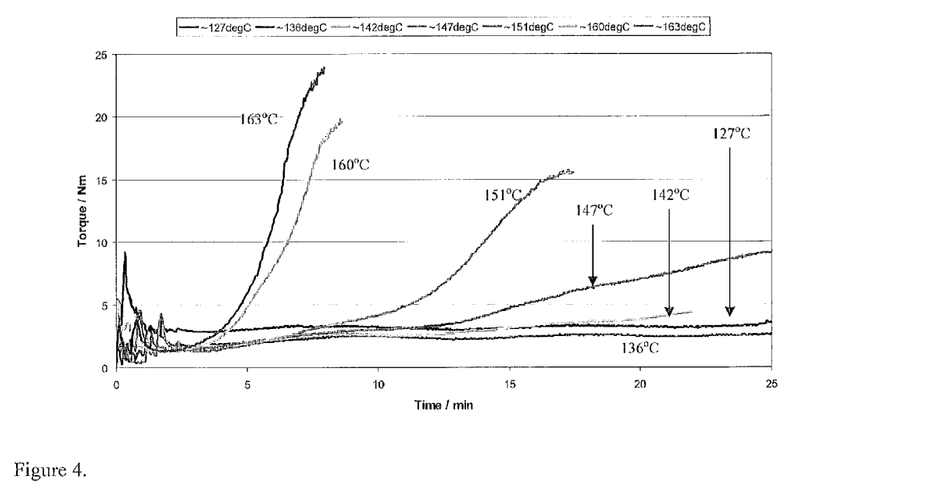
FIG. 4 is a representation of Isothermal Torque vs Time Measurements for TPU-2A+10 wt % (IROSTIC M7090/peroxide Masterbatch), as used in example 2.

FIG. 4 demonstrates that little cross-linking occurred within 25 minutes at temperatures below 142° C. but at higher temperatures cross-linking occurred with increasing rapidity.

Example 3

UV Cross-Linkable Aliphatic TPU

Materials with the formulations shown in Table 2 below were prepared by mixing the raw materials described in Table 1 using a mechanical stirrer, pouring on to a hot plate and curing for 1 hour at 120° C. to yield castings with a thickness of 2.9 mm. The materials were subsequently post-cured overnight at 90° C.

TABLE 1

Raw Materials.

| Name | Chemical Name | Role | Characteristics |
|---|---|---|---|
| Hydrogenated MDI | 4,4'-methylenene-bis(cyclohexylisocyanate) | Diisocyanate | NCOv = 32% |
| | Hydroxyl-terminated polycaprolactone | Polyol | OHv = 113.6 mg/gKOH |
| | 1,4-butanediol | Chain Extender | |
| 2-HEMA | 2-hydroxyethyl-methacrylate | Unsaturated Chain Stopper | |
| TMPTMA | Trimethylolpropane trimethacrylate | Thermal | |
| Irgacure 184 | Hydroxycyclohexyl-phenylketone, | UV Initiator | Mw = 203.28 |
| Benzoflex 2088 | Liquid aromatic esters | Catalyst Carrier | |
| DBTDL | dibutyltindilaurate stannous octoate | Catalyst Catalyst | |

TABLE 2

Formulations of Cross-Linkable Aliphatic TPUs.

| Chemical | TPU-3A | TPU-3B |
|---|---|---|
| Polyol | 47.88 | 44.42 |
| Hydrogenated MDI | 40.6 | 38.08 |
| 1,4-butanediol | 9.00 | 8.37 |
| 2-HEMA | 2.03 | 1.923 |
| Trimethylolpropane trimethacrylate | 0.00 | 7.00 |
| Irgacure 184 | 1.00 | 0.929 |
| catalyst 18% in Benzoflex 2088 | 0.0018 DBTDL | 0.0018 stannous octoate |

The materials were exposed to various doses of ultra-violet energy via irradiation by an ultra-violet lamp (Uvilink blacklight UV-cross-linker; wavelength=365 nm; intensity=5 mW/cm$^2$) for an appropriate period of time in order to deliver specific doses of radiation. They were then placed on a Kofler Hot Bench to check the melt behavior. Tables 3 & 4 describe the results and conclusions of these experiments. The Tables show that the TPU's are efficiently cross-linked by application of 0.6 J/cm$^2$ of UV light.

TABLE 3

Results & Conclusions of UV Irradiation of TPU-3A.

| UV-dose | Observations |
|---|---|
| 0 J/cm$^2$ | No cross-linking (both upper and bottom melt at very low temperature). |
| 0.2 J/cm$^2$ | Upper layer of sample is slightly cross-linked. The main part of the sample is not cross-linked at all. It melts. |
| 0.4 J/cm$^2$ | The upper portion is cross-linked. The bottom 0.5 mm of the sample partially melts. |
| 0.6 J/cm$^2$ | Cross-linked (does not melt). |
| 2 J/cm$^2$ | Cross-linked (the elongation is high and the tensile strength is improved compared to the non-cross-linked TPU). |

TABLE 4

Results & Conclusions of UV Irradiation of TPU-3B.

| UV-dose (Joules/cm2) | Observations |
| --- | --- |
| 0.0 J/cm$^2$ | No cross-linking (melts at 90-100° C.) |
| 0.2 J/cm$^2$ | Partially cross-linked (one side melts, other doesn't) |
| 0.4 J/cm$^2$ | Partially cross-linked (does not flow, but still sticky) |
| 0.6 J/cm$^2$ | Cross-linked (does not melt) |
| 0.8 J/cm$^2$ | Cross-linked (does not melt) |

Example 4

UV-Cross-Linkable TPU

Raw Materials: see example 3.
Composition 4A.

First 1.982 g of 2-HEMA, 8.968 g of 1,4-butanediol, and 0.388 g of Irgacure 184 were weighed into a glass jar. Then 40.81 g of polyol and eventually 47.85 g of hydrogenated MDI were added. After adding 0.125 g of catalyst emulsion, the reaction mixture was stirred with a lab mixer. When the reaction exotherm had reached a certain temperature, the reaction mixture was poured into a heated mould situated on a hot plate set at 120° C. It was allowed to cure on the hot plate for approximately 30 minutes. Then the solidified reaction mixture was cured for 24 hours in an oven set at 100° C.

Composition 4B

First 1.797 g of 2-HEMA, 8.085 g of 1,4-butanediol, 10.00 g of TMPTMA and 0.388 g of Irgacure 184 were weighed into a glass jar. Then 36.74 g of CAPA 2101A and 43.06 g of isocyanate Desmodur W were added. After adding 0.125 g of catalyst emulsion, the reaction mixture was stirred with a lab mixer. When the reaction exotherm had reached a certain temperature, the reaction mixture was poured into a heated mould situated on a hot plate set at 120° C. It was allowed to cure on the hot plate for approximately 30 minutes. Then the solidified reaction mixture was cured for 24 hours in an oven set at 100° C.

The samples were cross-linked by irradiation with a Uvilink blacklight UV-cross-linker (365 nm, 5 mW/cm$^2$; 0.6 J/cm$^2$ dose). The measured properties are reported in Table 5.

TABLE 5

Properties of Aliphatic TPUs Before & After Cross-Linking.

| Mechanical Property | DIN | Comp. 4A Not X-linked | Comp. 4A X-linked | Comp. 4B Not X-linked | Comp. 4B X-linked |
| --- | --- | --- | --- | --- | --- |
| Shore A Hardness | 53505 | 89.0 | 89.9 | 86.0 | 96.0 |
| Shore D Hardness | 53505 | 45.0 | 49.9 | 37.0 | 62.0 |
| Tensile Strength (MPa) | 53504 | 12.9 | 30.0 | 7.5 | 27.1 |
| Tensile Stress @ 50% elongation | 53504 | 5.42 | 9.72 | 5.40 | 17.22 |
| Elongation (%) | 53504 | 358 | 303 | 149 | 153 |

Example 4

Thermal Stabilization of Cross-Linkable TPU's

In this example the effect of inhibitors for the heat-activated cross-linking of the polymerizable unsaturated groups (e.g. acrylic) in the cross-linkable TPU formulations is investigated. In order to model this phenomenon liquid mixtures of the polyol, initiators, stabilizers and polymerizable unsaturated moieties (end-groups; co-cross-linkers) were prepared and placed at various points along a Kofler Hot Bench (a hot plate with a linear heat gradient ranging from 50° C.-265° C.). (Note: For ease of experimentation, the isocyanate and chain extender were omitted). The composition of the solution was determined by the target ratio of stabilizers, co-cross-linkers and polyol, in each given thermoplastic polyurethane (TPU) system. The onset of cross-linking was determined by the earliest of the following phenomenon to occur: development of "gels" in the material, solidification of liquid, color change from colorless to white.

Table 6 gives details of the raw materials used in the experiments and Table 7 gives the formulations which were investigated.

TABLE 6

Raw Materials.

| Chemical | Properties |
| --- | --- |
| Polybutyleneadipate | OHv = 70 mg KOH/g |
| Dipentaerythritol Pentaacrylate | OHv = 106 mg KOH/g |
| Irgacure 184 (Ciba-Geigy) | Hydroxycyclohexylphenylketone, Mw = 203.28 Photoinitiator |
| Irganox 1010 | Mw = 1176 Phenolic antioxidant |

TABLE 7

Formulations.

| Sample Number | Polyol (g) | Irgacure 184 (g) | Irganox 1010 (g) | Dipentaerythritol Pentaacrylate(g) |
| --- | --- | --- | --- | --- |
| 1 | 8.77 | 0.351 | 0 | 0.877 |
| 2 | 8.62 | 0.345 | 0.172 | 0.862 |
| 3 | 8.47 | 0.339 | 0.339 | 0.847 |
| 4 | 8.06 | 0.323 | 0 | 1.61 |
| 5 | 7.93 | 0.317 | 0.159 | 1.59 |
| 6 | 7.81 | 0.313 | 0.313 | 1.56 |
| 7 | 7.46 | 0.299 | 0 | 2.24 |
| 8 | 7.35 | 0.294 | 0.147 | 2.21 |
| 9 | 7.24 | 0.29 | 0.29 | 2.17 |
| 10 | 8.62 | 0.517 | 0 | 0.862 |

TABLE 7-continued

Formulations.

| Sample Number | Polyol (g) | Irgacure 184 (g) | Irganox 1010 (g) | Dipentaerythritol Pentaacrylate(g) |
| --- | --- | --- | --- | --- |
| 11 | 8.47 | 0.508 | 0.17 | 0.847 |
| 12 | 8.33 | 0.5 | 0.333 | 0.833 |

TABLE 7-continued

Formulations.

| Sample Number | Polyol (g) | Irgacure 184 (g) | Irganox 1010 (g) | Dipentaerythritol Pentaacrylate(g) |
|---|---|---|---|---|
| 13 | 7.94 | 0.476 | 0 | 1.59 |
| 14 | 7.81 | 0.469 | 0.156 | 1.56 |
| 15 | 7.69 | 0.462 | 0.308 | 1.54 |
| 16 | 7.35 | 0.441 | 0 | 2.21 |
| 17 | 7.25 | 0.435 | 0.145 | 2.17 |
| 18 | 7.14 | 0.429 | 0.286 | 2.14 |
| 19 | 8.47 | 0.678 | 0 | 0.847 |
| 20 | 8.33 | 0.667 | 0.167 | 0.8333 |
| 21 | 8.2 | 0.656 | 0.328 | 0.82 |
| 22 | 7.81 | 0.625 | 0 | 1.56 |
| 23 | 7.69 | 0.615 | 0.154 | 1.54 |
| 24 | 7.58 | 0.606 | 0.303 | 1.515 |
| 25 | 7.25 | 0.58 | 0 | 2.17 |
| 26 | 7.14 | 0.871 | 0.143 | 2.14 |
| 27 | 7.04 | 0.563 | 0.282 | 2.11 |

The liquid sample formulations were produced under the conditions which are described in the procedure below. All materials were used at ambient temperature unless otherwise stated. A 30 ml glass jar was heated to 120° C. Subsequently the jar was placed into a thermal foamed jacket, which lessened the exposure of the solution to UV light and minimized heat loss. Specified amounts of Irganox 1010 and Irgacure 184 were added to the jar. Addition of the polyol, which had been heated to 80° C., followed. If the powder package had not dissolved in the polyol the jars were placed in an oil bath at 120° C. until there was no sediment left in the jar. Once the powder package had dissolved the mixture was agitated with a mechanical roller for 15 minutes, after which the specified amount of dipentaerythritolpentacrylate was added. Agitation of the mixture was conducted for a second time on the mechanical roller for 2 hours and the solution was subsequently stirred. The liquid mixture was placed along the entire length of the Kofler hot bench with a pipette in order to investigate the complete temperature gradient (50° C.-265° C.). The temperature at which the onset of cross-linking was observed was determined at time intervals of 15 seconds up until 1 minutes after which time intervals of 30 seconds were used. The results for each formulation are recorded in Table 8.

The results in Table 8 show the relationship between the concentration of the Irganox 1010 stabilizer and the temperature at which a modified TPU will cross-link. Increasing the Irganox 1010 concentration delays the onset of cross-linking until higher temperatures and longer times. This stabilizing effect will lead to inhibition of cross-linking during processing with consequent benefits such as the reduction of gel formation in extruded films. It was possible to cross-link all of the solutions under UV light which implies that stabilizers such as Irganox 1010 deliver the benefit of increasing thermal stability without affecting the cross-linking process under UV light.

TABLE 8

Cross-Linking Onset Temperatures at Different Time Intervals for Formulations in Table 7

| Sample Number | Cross-linking temperature after time (s) | | | | | | | | | | | | |
|---|---|---|---|---|---|---|---|---|---|---|---|---|---|
| | 15 | 30 | 45 | 60 | 90 | 120 | 150 | 180 | 210 | 240 | 270 | 300 | 330 |
| 1 | 212 | 196 | 196 | 196 | 196 | 196 | 196 | 196 | 196 | 196 | 196 | 196 | 196 |
| 2 | | | | 260 | 260 | 260 | 260 | 260 | 260 | 260 | 260 | 260 | 260 |
| 3 | | | | | | | | | | | | | |
| 4 | 208 | 198 | 198 | 198 | 180 | 180 | 180 | 180 | 180 | 180 | 180 | 180 | 180 |
| 5 | 260 | 256 | 256 | 256 | 256 | 256 | 256 | 256 | 256 | 256 | 256 | 256 | 256 |
| 6 | | | | | | | | | | | | | |
| 7 | 204 | 188 | 170 | 170 | 170 | 170 | 170 | 170 | 170 | 170 | 170 | 170 | 170 |
| 8 | | 260 | 260 | 260 | 260 | 260 | 260 | 260 | 260 | 260 | 260 | 260 | 260 |
| 9 | | | | | | | | | | | | | |
| 10 | 252 | 232 | 202 | 198 | 196 | 196 | 196 | 196 | 195 | 195 | 194 | 194 | 194 |
| 11 | | | | | | | | | | | | | |
| 12 | | | | | | | | | | | | | |
| 13 | 222 | 214 | 214 | 209 | 209 | 209 | 209 | 209 | 209 | 209 | 209 | 209 | 209 |
| 14 | | 260 | 260 | 258 | 258 | 258 | 258 | 258 | 258 | 258 | 258 | 258 | 258 |
| 15 | | | | | | | | | | | | | |
| 16 | 238 | 218 | 216 | 216 | 206 | 206 | 206 | 206 | 206 | 206 | 206 | 206 | 206 |
| 17 | 260 | 260 | 260 | 260 | 260 | 260 | 260 | 260 | 260 | 260 | 260 | 260 | 260 |
| 18 | | | | | | | | | | | | | |
| 19 | 242 | 218 | 210 | 209 | 206 | 206 | 206 | 206 | 206 | 206 | 206 | 206 | 206 |
| 20 | | | | | | | | | | | | | |
| 21 | | | | | | | | | | | | | |
| 22 | 230 | 209 | 199 | 199 | 199 | 199 | 199 | 199 | 199 | 199 | 199 | 199 | 199 |
| 23 | | | | | | | | | | | | | |
| 24 | | | | | 262 | 262 | 262 | 262 | 262 | 262 | 262 | 262 |
| 25 | 246 | 230 | 214 | 210 | 202 | 188 | 188 | 188 | 188 | 188 | 188 | 188 | 188 |
| 26 | | 258 | 258 | 258 | 258 | 258 | 258 | 258 | 258 | 258 | 258 | 258 | 258 |
| 27 | | | | | | | | | | | | | |

(Note.
A blank box shows that no cross-linking was evident).

The invention claimed is:

1. A cross-linkable elastomeric thermoplastic polyurethane that is urea free, isocyanurate free, oxazolinyl free, functional radically-polymerizable pendant group free and having terminal functional radically-polymerizable groups at both ends; and wherein the thermoplastic polyurethane has a molecular weight ranging from 12000 to 500000, wherein the thermoplastic polyurethane is the reaction product of a reaction system consisting of a polyfunctional isocyanate, a polyfunctional polyol and a monol or monoamine comprising radically-polymerizable unsaturation(s), a diol chain extender, and, optionally, a radically polymerizable co-crosslinker; and wherein the polyfunctional polyol is selected from the group consisting of polyesteramides, polythioethers, polycarbonates, polyacetals, polyolefins, polysiloxanes, polyesters, and polyethers, and wherein the radically polymizable co-crosslinker comprises dipentaerythritolpentaacrylate, trimethylolpropanetrimethacrylate, ditrimethylolpropanetriacrylate, pentaerythritoltetraacrylate, trimethylolpropanetriacrylate, butanedioldimethacrylate, ethoxylated pentaerythritoltetraacrylate, hexanedioldimethacrylate, hexanedioldiacrylate, laurylmethacrylate, 2-phenoxyethylmethacrylate, 2-phenoxyethylacrylate, polyethyleneglycoldiacrylate, polypropyleneglycoldiacrylate, poycaprolactonediacrylate, or combinations thereof.

2. The thermoplastic polyurethane according to claim 1 wherein the monol or monoamine comprising unsaturation is selected from one or more of hydroxyethylacrylate, hydroxyethylmethacrylate, pentaerythritoltriacrylate, caprolactonemonoacrylate, dipentaerythritolpentaacrylate, 2-hydroxypropylacrylate, 2-hydroxypropylmethacrylate, 4-hydroxybutylacrylate, 4-hydroxybutyl-methacrylate, 3-chloro-2-hydroxypropylacrylate, 6-hydroxyhexylacrylate, 6-hydroxyhexyl methacrylate, allylalcohol, 2-methyl-3-butene-2-ol, cyclohexanedimethanolmonovinylether, and diethyleneglycolmonovinylether.

3. The thermoplastic polyurethane according to claim 1, wherein the amount of monol or monoamine comprising unsaturation is from 0.001 moles/100 g to 0.016 moles/100 g.

4. The thermoplastic polyurethane according to claim 1 wherein said monol or monoamine comprising unsaturation is a chain-stopper.

5. The thermoplastic polyurethane according to claim 1 wherein the thermoplastic polyurethane has a hard block level ranging from 7 to 60 wt %.

6. Process comprising preparing a cross-linkable elastomeric thermoplastic polyurethane that is urea free, isocyanurate free, oxazolinyl free, functional radically-polymerizable pendant group free and having terminal functional radically-polymerizable groups at both ends; wherein the process comprises reacting a reactive system consisting of: a polyfunctional isocyanate, a polyfunctional polyol, a monol or monoamine comprising radically-polymerizable unsaturation(s), a diol chain extender, and, optionally, a radically polymerizable co-crosslinker; wherein the thermoplastic polyurethane has a molecular weight ranging from 12000 to 500000; and wherein the polyfunctional polyol is selected from the group consisting of polyesteramides, polythioethers, polycarbonates, polyacetals, polyolefins, polysiloxanes, polyesters, and polyethers, and wherein the radically polymerizable co-crosslinker comprises dipentaerythritolpentaacrylate, trimethylolpropanetrimethacrylate, ditrimethylolpropanetriacrylate, pentaerythritoltetraacrylate, trimethylolpropanetriacrylate, butanedioldimethacrylate, ethoxylated pentaerythritoltetraacrylate, hexanedioldimethacrylate, hexanedioldiacrylate, laurylmethacrylate, 2-phenoxyethylmethacrylate, 2-phenoxyethylacrylate, polyethyleneglycoldiacrylate, polypropyleneglycoldiacrylate, poycaprolactonediacrylate, or combinations thereof.

7. Process according to claim 6, including preparing the cross-linkable elastomeric thermoplastic polyurethane by either a bulk process, or a continuous reactive extrusion process, the bulk process being a batch process or a cast process or continuous process.

8. A thermoset polyurethane comprising a mesophase separated polyurethane structure and having a molecular weight between cross-links of from 20000 to 200000 wherein the thermoset polyurethane is the product of the crosslinking of a thermoplastic polyurethane composition that comprises a thermoplastic polyurethane that has a molecular weight ranging from 12000 to 500000, wherein the thermoplastic polyurethane is the reaction product of a reaction system consisting of: a polyfunctional isocyanate, a polyfunctional polyol and a monol or monoamine comprising radically-polymerizable unsaturation(s), a diol chain extender, and, optionally, a radically polymerizable co-crosslinker, and wherein said thermoplastic polyurethane is urea free, isocyanurate free, oxazolinyl free, functional radically-polymerizable pendant group free and that has terminal functional radically-polymerizable groups at both ends; and wherein the polyfunctional polyol is selected from the group consisting of polyesteramides, polythioethers, polycarbonates, polyacetals, polyolefins, polysiloxanes, polyesters, and polyethers, and wherein the radically polymerizable co-crosslinker comprises dipentaerythritolpentaacrylate, trimethylolpropanetrimethacrylate, ditrimethylolpropanetriacrylate, pentaerythritoltetraacrylate, trimethylolpropanetriacrylate, butanedioldimethacrylate, ethoxylated pentaerythritoltetraacrylate, hexanedioldimethacrylate, hexanedioldiacrylate, laurylmethacrylate, 2-phenoxyethylmethacrylate, 2-phenoxyethylacrylate, polyethyleneglycoldiacrylate, polypropyleneglycoldiacrylate, poycaprolactonediacrylate, or combinations thereof.

9. Process for preparing a thermoset polyurethane, comprising cross-linking a thermoplastic polyurethane composition that comprises a thermoplastic polyurethane that has a molecular weight ranging from 12000 to 500000, the process comprising reacting a reaction system consisting of: a polyfunctional isocyanate, a polyfunctional polyol and a monol or monoamine comprising radically-polymerizable unsaturation(s), and a diol chain extender, and, optionally, a radically polymerisable co-crosslinker, and wherein said thermoplastic polyurethane is urea free, isocyanurate free, oxazolinyl free, functional radically-polymerizable pendant group free and that has terminal functional radically-polymerizable groups at both ends; and wherein the polyfunctional polyol is selected from the group consisting of polyesteramides, polythioethers, polycarbonates, polyacetals, polyolefins, polysiloxanes, polyesters, and polyethers, and wherein the radically polymerizable co-crosslinker comprises dipentaerythritolpentaacrylate, trimethylolpropanetrimethacrylate, ditrimethylolpropanetriacrylate, pentaerythritoltetraacrylate, trimethylolpropanetriacrylate, butanedioldimethacrylate, ethoxylated pentaerythritoltetraacrylate, hexanedioldimethacrylate, hexanedioldiacrylate, laurylmethacrylate, 2-phenoxyethylmethacrylate, 2-phenoxyethylacrylate, polyethyleneqlycoldiacrylate, polypropyleneglycoldiacrylate, poycaprolactonediacrylate, or combinations thereof.

10. Process according to claim 9, including carrying out the process in the presence of a stabilizer.

11. Process according to claim 9 wherein said cross-linking occurs at least partially during extrusion or injection of said thermoplastic polyurethane composition.

12. Process according to claim 9, comprising preparing a film of the thermoplastic polyurethane, either by casting or extrusion, applying said film to a substrate, and cross-linking said film onto said substrate, where the cross-linking is optionally partially carried out before application onto the substrate.

13. Process according to claim 9, comprising applying said composition to a substrate and subsequent cross-linking onto said substrate.

14. Process according to claim 9, wherein the cross-linking is either thermal or actinic-radiation activated.

15. Process according to claim 9, including carrying out the process in the presence of a blowing agent.

16. Process according to claim 9, including manufacturing injection-moulded articles.

17. Process according to claim 9 including manufacturing protective films using the thermoset polyurethane.

18. Process according to claim 9 including manufacturing one or more of extruded profiles, tubes and cable jackets.

19. Reaction system consisting of:
a) a polyfunctional isocyanate;
b) a polyfunctional polyol selected from the group consisting of polyesteramides, polythioethers, polycarbonates, polyacetals, polyolefins, polysiloxanes, polyesters, and polyethers;
c) a diol chain extender;
d) a monol or monoamine comprising radically polymerizable unsaturation; or a prepolymer thereof;

e) optionally, a radically polymerisable co-crosslinker comprises dipentaerythritolpentaacrylate, trimethylolpropanetrimethacrylate, ditrimethylolpropanetriacrylate, pentaerythritoltetraacrylate, trimethylolpropanetriacrylate, butanedioldimethacrylate, ethoxylated pentaerythritoltetraacrylate, hexanedioldimethacrylate, hexanedioldiacrylate, laurylmethacrylate, 2-phenoxyethylmethacrylate, 2-phenoxyethylacrylate, polyethyleneglycoldiacrylate, polypropyleneglycoldiacrylate, poycaprolactonediacrylate, or combinations thereof;

wherein after polymerization, the material formed from the reaction system has a molecular weight ranging from 12000 to 500000.

* * * * *